(12) United States Patent
Lee et al.

(10) Patent No.: US 10,104,415 B2
(45) Date of Patent: Oct. 16, 2018

(54) SHARED SCENE MESH DATA SYNCHRONISATION

(71) Applicant: Microsoft Technology Licensing, LLC, Redmond, WA (US)

(72) Inventors: Ming-Chieh Lee, Bellevue, WA (US); Mei-Hsuan Lu, Bellevue, WA (US); Robert Aichner, Bellevue, WA (US); Ryan S. Menezes, Woodinville, WA (US); Abhishek Abhishek, Sammamish, WA (US); Bofan Hsu, Bothell, WA (US); Ermin Kozica, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 14/602,242

(22) Filed: Jan. 21, 2015

(65) Prior Publication Data

US 2016/0212468 A1 Jul. 21, 2016

(51) Int. Cl.
| | |
|---|---|
| *H04N 7/173* | (2011.01) |
| *H04N 21/2668* | (2011.01) |
| *H04N 21/61* | (2011.01) |
| *H04N 5/44* | (2011.01) |
| *H04N 21/2383* | (2011.01) |
| *H04N 21/4223* | (2011.01) |
| *H04N 21/438* | (2011.01) |

(Continued)

(52) U.S. Cl.
CPC ........... *H04N 21/2668* (2013.01); *H04N 5/44* (2013.01); *H04N 13/00* (2013.01); *H04N 13/0048* (2013.01); *H04N 13/0246* (2013.01); *H04N 13/044* (2013.01); *H04N 13/161* (2018.05); *H04N 13/246* (2018.05); *H04N 13/344* (2018.05); *H04N 21/2383* (2013.01); *H04N 21/23614* (2013.01); *H04N 21/4223* (2013.01); *H04N 21/4382* (2013.01); *H04N 21/6125* (2013.01)

(58) Field of Classification Search
CPC combination set(s) only.
See application file for complete search history.

(56) References Cited

U.S. PATENT DOCUMENTS

| | | | |
|---|---|---|---|
| 7,174,031 B2* | 2/2007 | Rhoads | G06Q 30/02 382/107 |
| 2007/0005795 A1* | 1/2007 | Gonzalez | G06F 17/30017 709/232 |

(Continued)

OTHER PUBLICATIONS

"International Preliminary Report on Patentability", Application No. PCT/US2016/014205, dated Mar. 29, 2017, 6 pages.

(Continued)

*Primary Examiner* — Kieu Oanh T Bui
(74) *Attorney, Agent, or Firm* — Schwegman Lundberg & Woessner, P.A.

(57) ABSTRACT

A user device within a communication architecture, the user device comprising: an image capture device configured to determine image data for the creation of a video channel defining the shared scene; an intrinsic/extrinsic data determiner configured to determine intrinsic/extrinsic capture device data associated with the image capture device; and a video encoder configured to encode the image data and intrinsic/extrinsic capture device data within the video channel.

19 Claims, 12 Drawing Sheets

(51) Int. Cl.

| | |
|---|---|
| *H04N 13/161* | (2018.01) |
| *H04N 13/246* | (2018.01) |
| *H04N 13/344* | (2018.01) |
| *H04N 13/00* | (2018.01) |
| *H04N 21/236* | (2011.01) |
| *H04N 13/02* | (2006.01) |
| *H04N 13/04* | (2006.01) |

(56) References Cited

U.S. PATENT DOCUMENTS

| | | |
|---|---|---|
| 2010/0309286 A1 | 12/2010 | Chen et al. |
| 2011/0242278 A1 | 10/2011 | Yang et al. |
| 2014/0192165 A1 | 7/2014 | Norkin et al. |
| 2014/0248950 A1* | 9/2014 | Tosas Bautista .......... G06F 3/01 463/31 |

OTHER PUBLICATIONS

"Second Written Opinion", Application No. PCT/US2016/014205, dated Dec. 8, 2016, 5 pages.

"International Search Report and Written Opinion", Application No. PCT/US2016/014205, dated Apr. 29, 2016, 10 pages.

\* cited by examiner

SHARED SCENE MESH DATA SYNCHRONISATION

BACKGROUND

Packet-based communication systems allow the user of a device, such as a personal computer, to communicate across the computer network using a packet protocol such as Internet Protocol (IP). Packet-based communication systems can be used for various types of communication events. Communication events which can be established include voice calls, video calls, instant messaging, voice mail, file transfer and others. These systems are beneficial to the user as they are often of significantly lower cost than fixed line or mobile networks. This may particularly be the case for long-distance communication. To use a packet-based system, the user installs and executes client software on their device. The client software provides the packet-based connections as well as other functions such as registration and authentication.

Communications systems allow users of devices to communicate across a computer network such as the internet. Communication events which can be established include voice calls, video calls, instant messaging, voice mail, file transfer and others. With video calling, the callers are able to view video images.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Nor is the claimed subject matter limited to implementations that solve any or all of the disadvantages noted in the background section.

Embodiments of the present disclosure relate to management and synchronisation of objects within a shared scene, such as generated in collaborative mixed reality applications. In collaborative mixed reality applications, participants can visualize, place, and interact with objects in a shared scene. The shared scene is typically a representation of the surrounding space of one of the participants, for example the scene may include video images from the viewpoint of one of the participants. An object or virtual object can be 'placed' within the scene and may have a visual representation which can be 'seen' and interacted with by the participants. Furthermore the object can have associated content. For example the object may have associated content such as audio/video or text. A participant may, for example, place a video player object in a shared scene, and interact with it to start playing a video for all participants to watch. Another participant may then interact with the video player object to control the playback or to change its position in the scene.

The inventors have recognised that in order to maintain the synchronisation of these objects within the scheme the efficient transfer of surface recreation data (also known as mesh data) may be significant.

According to first aspect of the present disclosure there is provided a user device within a communication architecture, the user device comprising: an image capture device configured to determine image data for the creation of a video channel defining the shared scene; an intrinsic/extrinsic data determiner configured to determine intrinsic/extrinsic capture device data associated with the image capture device; and a video encoder configured to encode the image data and intrinsic/extrinsic capture device data within the video channel.

According to another aspect of the present disclosure there is provided a user device within a communication architecture, the user device comprising: a receiver configured to receive a video channel comprising image data for the shared scene determined from an image capture device and intrinsic/extrinsic capture device data associated with the image capture device; and a video decoder configured to extract and decode the image data and the intrinsic/extrinsic capture device data associated with the image capture device from the video channel.

According to a third aspect of the present disclosure there is provided a method implemented at user device within a communication architecture, the method comprising: determining image data from an image capture device for the creation of a video channel defining the shared scene; determining intrinsic/extrinsic capture device data associated with the image capture device; and encoding the image data and intrinsic/extrinsic capture device data within the video channel.

According to a fourth aspect of the present disclosure there is provided a method implemented at a protocol endpoint entity within a shared scene architecture, the method comprising: receiving a video channel comprising image data for the shared scene determined from an image capture device and intrinsic/extrinsic capture device data associated with the image capture device; extracting and decoding the image data from the video channel; and extracting the intrinsic/extrinsic capture device data associated with the image capture device.

According to a fifth aspect of the present disclosure there is provided a computer program product, the computer program product being embodied on a non-transient computer-readable medium and configured so as when executed on a processor of a user device within a communication architecture, to: determine image data from an image capture device for the creation of a video channel defining the shared scene; determine intrinsic/extrinsic capture device data associated with the image capture device; and encode the image data and intrinsic/extrinsic capture device data within the video channel.

According to a sixth aspect of the present disclosure there is provided a computer program product, the computer program product being embodied on a non-transient computer-readable medium and configured so as when executed on a processor of a user device within a communication architecture, to: receive a video channel comprising image data for the shared scene determined from an image capture device and intrinsic/extrinsic capture device data associated with the image capture device; extract and decode the image data from the video channel; and extract the intrinsic/extrinsic capture device data associated with the image capture device.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Embodiments of the present disclosure are described by way of example only.

Figure 1:
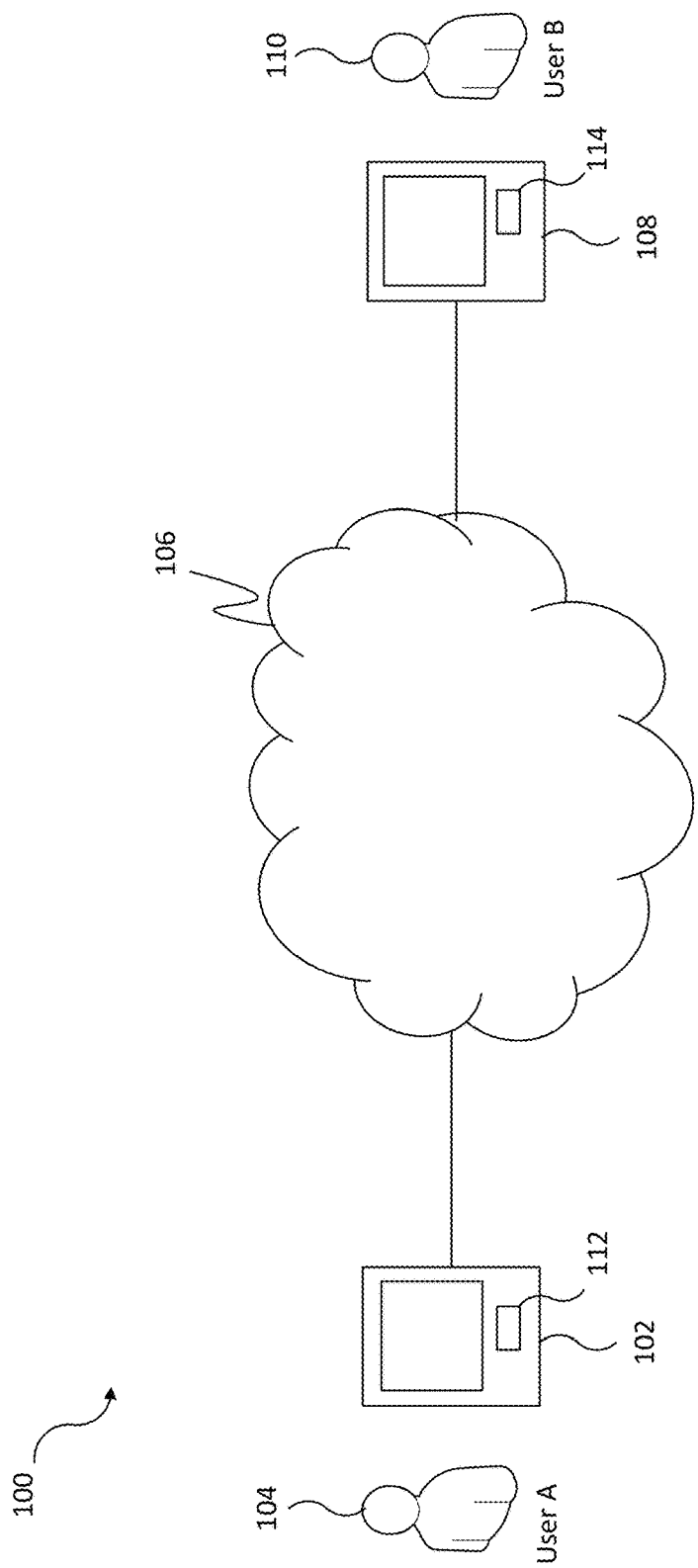
FIG. 1 shows a schematic view of a communication system.

FIG. 1 shows a communication system 100 comprising a first user 104 (User A) who is associated with a user terminal or device 102 and a second user 110 (User B) who is associated with a second user terminal or device 108. The user devices 102 and 108 can communicate over a communication network 106 in the communication system 100, thereby allowing the users 104 and 110 to communicate with each other over the communication network 106. The communication network 106 may be any suitable network which has the ability to provide a communication channel between the user device 102 and the second user device 108. For example, the communication network 106 may be the Internet or another type of network such as a high data rate cellular or mobile network, such as a $3^{rd}$ generation ("3G") mobile network.

Note that in alternative embodiments, user devices can connect to the communication network 106 via an additional intermediate network not shown in FIG. 1. For example, if the user device 102 is a mobile device, then it can connect to the communication network 106 via a cellular or mobile network (not shown in FIG. 1), for example a GSM, UMTS, 4G or the like network.

The user devices 102 and 104 may be any suitable device and may for example, be a mobile phone, a personal digital assistant ("PDA"), a personal computer ("PC") (including, for example, Windows™, Mac OS™ and Linux™ PCs), a tablet computer, a gaming device, a wearable device or other embedded device able to connect to the communication network 106. The wearable device may comprise a wearable headset.

It should be appreciated that one or more of the user devices may be provided by a single device. One or more of the user devices may be provided by two or more devices which cooperate to provide the user device or terminal.

The user device 102 is arranged to receive information from and output information to User A 104.

The user device 102 executes a communication client application 112, provided by a software provider associated with the communication system 100. The communication client application 112 is a software program executed on a local processor in the user device 102. The communication client application 112 performs the processing required at the user device 102 in order for the user device 102 to transmit and receive data over the communication system 100. The communication client application 112 executed at the user device 102 may be authenticated to communicate over the communication system through the presentation of digital certificates (e.g. to prove that user 104 is a genuine subscriber of the communication system—described in more detail in WO 2005/009019).

The second user device 108 may be the same or different to the user device 102. The second user device 108 executes, on a local processor, a communication client application 114 which corresponds to the communication client application 112 executed at the user terminal 102. The communication client application 114 at the second user device 108 performs the processing required to allow User B 110 to communicate over the network 106 in the same way that the communication client application 112 at the user device 102 performs the processing required to allow the User A 104 to communicate over the network 106. The user devices 102 and 108 are end points in the communication system. FIG. 1 shows only two users (104 and 110) and two user devices (102 and 108) for clarity, but many more users and user devices may be included in the communication system 100, and may communicate over the communication system 100 using respective communication clients executed on the respective user devices, as is known in the art.

Figure 2:
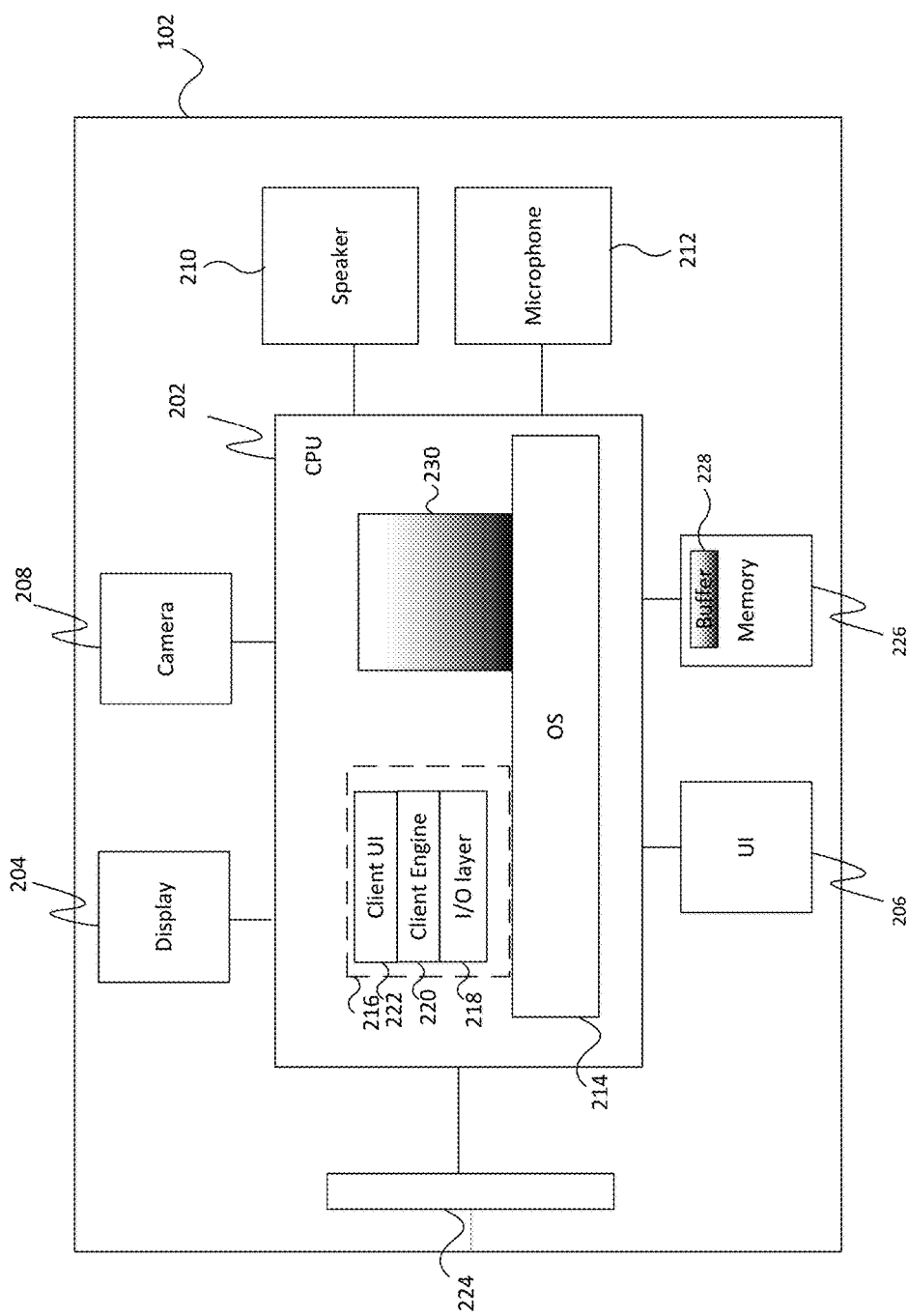
FIG. 2 shows a schematic view of a user device.

FIG. 2 illustrates a schematic view of the user device 102 on which is executed a communication client application for communicating over the communication system 100. The user device 102 comprises a central processing unit ("CPU") 202, to which is connected a display 204 such as a screen or touch screen, input devices such as a user interface 206 (for example a keypad), a camera 208, and touch screen 204.

In some embodiments the user interface 206 may be a keypad, keyboard, mouse, pointing device, touchpad or similar. However the user interface 206 may be any suitable user interface input device, for example gesture or motion control user input, head-tracking or eye-tracking user input. Furthermore the user interface 206 in some embodiments may be a 'touch' or 'proximity' detecting input configured to determine the proximity of the user to a display 204.

In embodiments described below the camera 208 may be a conventional webcam that is integrated into the user device 102, or coupled to the user device via a wired or wireless connection. Alternatively, the camera 208 may be a depth-aware camera such as a time of flight or structured light camera. Furthermore the camera 208 may comprise multiple image capturing elements. The image capturing elements may be located at different positions or directed with differing points or view such that images from each of the image capturing elements may be processed or combined. For example the image capturing elements images may be compared in order to determine depth or object distance from the images based on the parallax errors. Furthermore in some examples the images may be combined to produce an image with a greater resolution or greater angle of view than would be possible from a single image capturing element image.

An output audio device 210 (e.g. a speaker, speakers, headphones, earpieces) and an input audio device 212 (e.g. a microphone, or microphones) are connected to the CPU 202. The display 204, user interface 206, camera 208, output audio device 210 and input audio device 212 may be integrated into the user device 102 as shown in FIG. 2. In alternative user devices one or more of the display 204, the user interface 206, the camera 208, the output audio device 210 and the input audio device 212 may not be integrated into the user device 102 and may be connected to the CPU 202 via respective interfaces. One example of such an interface is a USB interface.

The CPU 202 is connected to a network interface 224 such as a modem for communication with the communication network 106. The network interface 224 may be integrated into the user device 102 as shown in FIG. 2. In alternative user devices the network interface 224 is not integrated into the user device 102. The user device 102 also comprises a memory 226 for storing data as is known in the art. The memory 226 may be a permanent memory, such as ROM. The memory 226 may alternatively be a temporary memory, such as RAM.

The user device 102 is installed with the communication client application 112, in that the communication client application 112 is stored in the memory 226 and arranged for execution on the CPU 202. FIG. 2 also illustrates an operating system ("OS") 214 executed on the CPU 202. Running on top of the OS 214 is a software stack 216 for the communication client application 112 referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the communication network 106 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user devices of the communication system 100. The client engine layer 220 handles the connection management functions of the VoIP system as discussed above, such as establishing calls or other connections by server-based or P2P address look-up and authentication. The client engine may also be responsible for other secondary functions not discussed herein. The client engine 220 also communicates with the client user interface layer 222. The client engine 220 may be arranged to control the client user interface layer 222 to present information to the user of the user device 102 via the user interface of the communication client application 112 which is displayed on the display 204 and to receive information from the user of the user device 102 via the user interface.

Also running on top of the OS 214 are further applications 230. Embodiments are described below with reference to the further applications 230 and communication client application 112 being separate applications, however the functionality of the further applications 230 described in more detail below can be incorporated into the communication client application 112.

Figure 3:
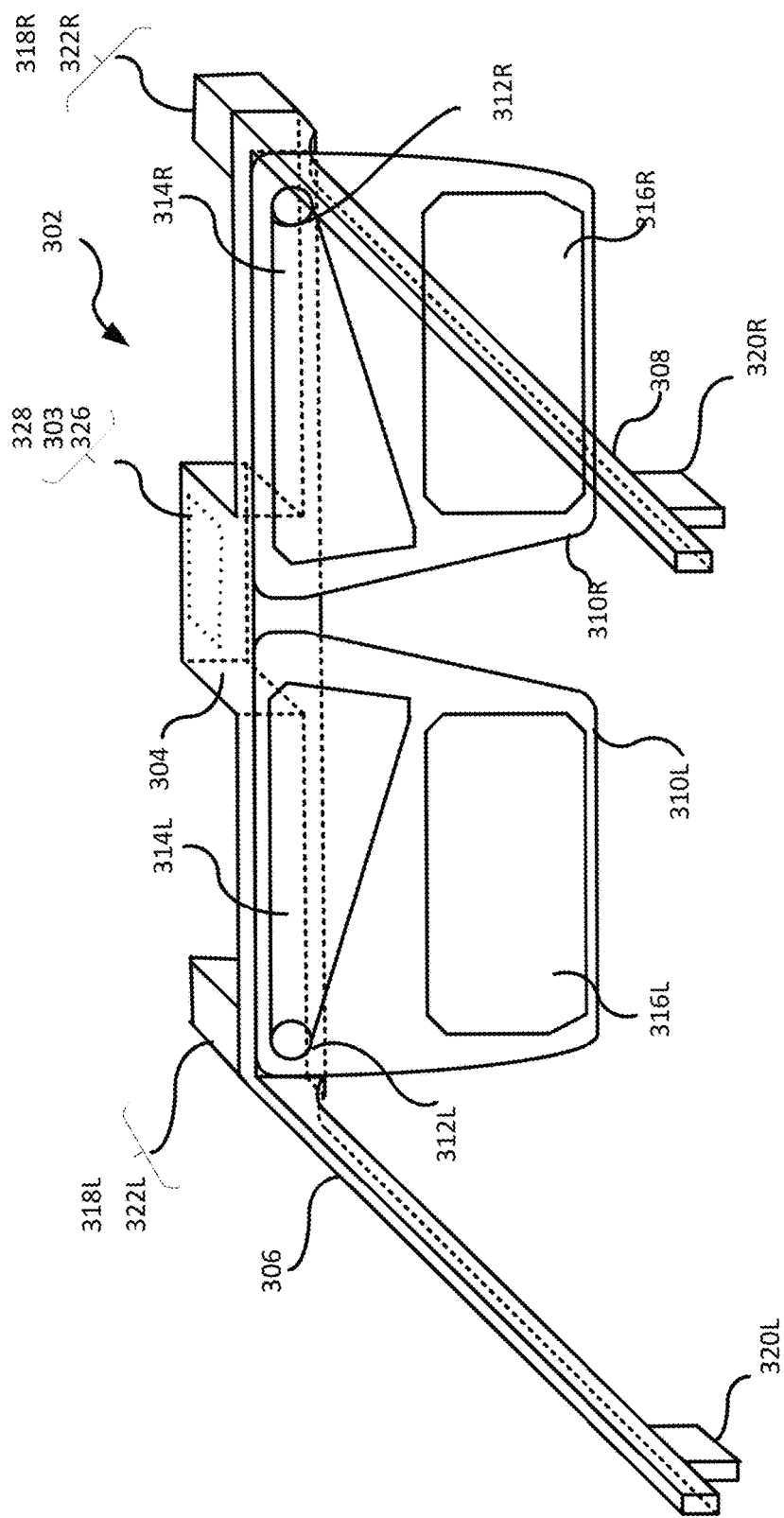
FIG. 3 shows a schematic view of a user device as a wearable headset.

In one embodiment, shown in FIG. 3, the user device 102 is in the form of a headset or head mounted user device. The head mounted user device comprises a frame 302 having a central portion 304 intended to fit over the nose bridge of a wearer, and a left and right supporting extensions 306, 308 which are intended to fit over a user's ears. Although the supporting extensions 306, 308 are shown to be substantially straight, they could terminate with curved parts to more comfortably fit over the ears in the manner of conventional spectacles.

The frame 302 supports left and right optical components, labelled 310L and 310R, which may be waveguides e.g. formed of glass or polymer.

The central portion 304 may house the CPU 303, memory 328 and network interface 324 such as described in FIG. 2. Furthermore the frame 302 may house a light engines in the form of micro displays and imaging optics in the form of convex lenses and a collimating lenses. The light engine may in some embodiments comprise a further processor or employ the CPU 303 to generate an image for the micro displays. The micro displays can be any type of light of image source, such as liquid crystal display (LCD), backlit LCD, matrix arrays of LEDs (whether organic or inorganic) and any other suitable display. The displays may be driven by circuitry which activates individual pixels of the display to generate an image. The substantially collimated light from each display is output or coupled into each optical component, 310L, 310R by a respective in-coupling zone 312L, 312R provided on each component. In-coupled light may then be guided, through a mechanism that involves diffraction and TIR, laterally of the optical component in a respective intermediate (fold) zone 314L, 314R, and also downward into a respective exit zone 316L, 316R where it exits towards the users' eye.

The optical component 310 may be substantially transparent such that a user can not only view the image from the light engine, but also can view a real world view through the optical components.

The optical components may have a refractive index n which is such that total internal reflection takes place to guide the beam from the light engine along the intermediate expansion zone 314, and down towards the exit zone 316.

The user device 102 in the form of the headset or head mounted device may also comprise at least one camera configured to capture the field of view of the user wearing the headset. For example the headset shown in FIG. 3 comprises stereo cameras 318L and 318R configured to capture an approximate view (or field of view) from the user's left and right eyes respectfully. In some embodiments one camera may be configured to capture a suitable video image and a further camera or range sensing sensor configured to capture or determine the distance from the user to objects in the environment of the user.

Similarly the user device 102 in the form of the headset may comprise multiple microphones mounted on the frame 306 of the headset. The example shown in FIG. 3 shows a left microphone 322L and a right microphone 322R located at the 'front' ends of the supporting extensions or arms 306 and 308 respectively. The supporting extensions or arms 306 and 308 may furthermore comprise 'left' and 'right' channel speakers, earpiece or other audio output transducers. For example the headset shown in FIG. 3 comprises a pair of bone conduction audio transducers 320L and 320R functioning as left and right audio channel output speakers.

The concepts are described herein with respect to a mixed reality (MR) application, however in other embodiments the same concepts may be applied to any multiple party communication application. Mixed reality applications may for example involve the sharing of a scene, wherein a device comprising a camera is configured to capture an image or video and transmit this image or images to other devices. Furthermore the image or video may be augmented or annotated by the addition, deletion and interaction of objects. These objects or virtual objects can be 'placed' within the image scene and may have a visual representation which can be 'seen' and interacted with by the participants (including the scene owner). Objects may be defined not only by position but comprise other attributes, such as object type and state. The objects, for example, may have associated content such as audio/video/text content. A participant may, for example, place a video player object in a shared scene. The same participant may then interact with the object to start playing a video for all participants to watch. Another participant may then interact with the video player object to control the playback or to change its position in the scene.

The placement of the object may be made with respect to the scene and furthermore a three dimensional representation of the scene. In order to enable accurate placement of the object to be represented or rendered on a remote device surface reproduction (SR) or mesh data associated with the scene may be passed to all of the participants of the shared scene.

Figure 4A:
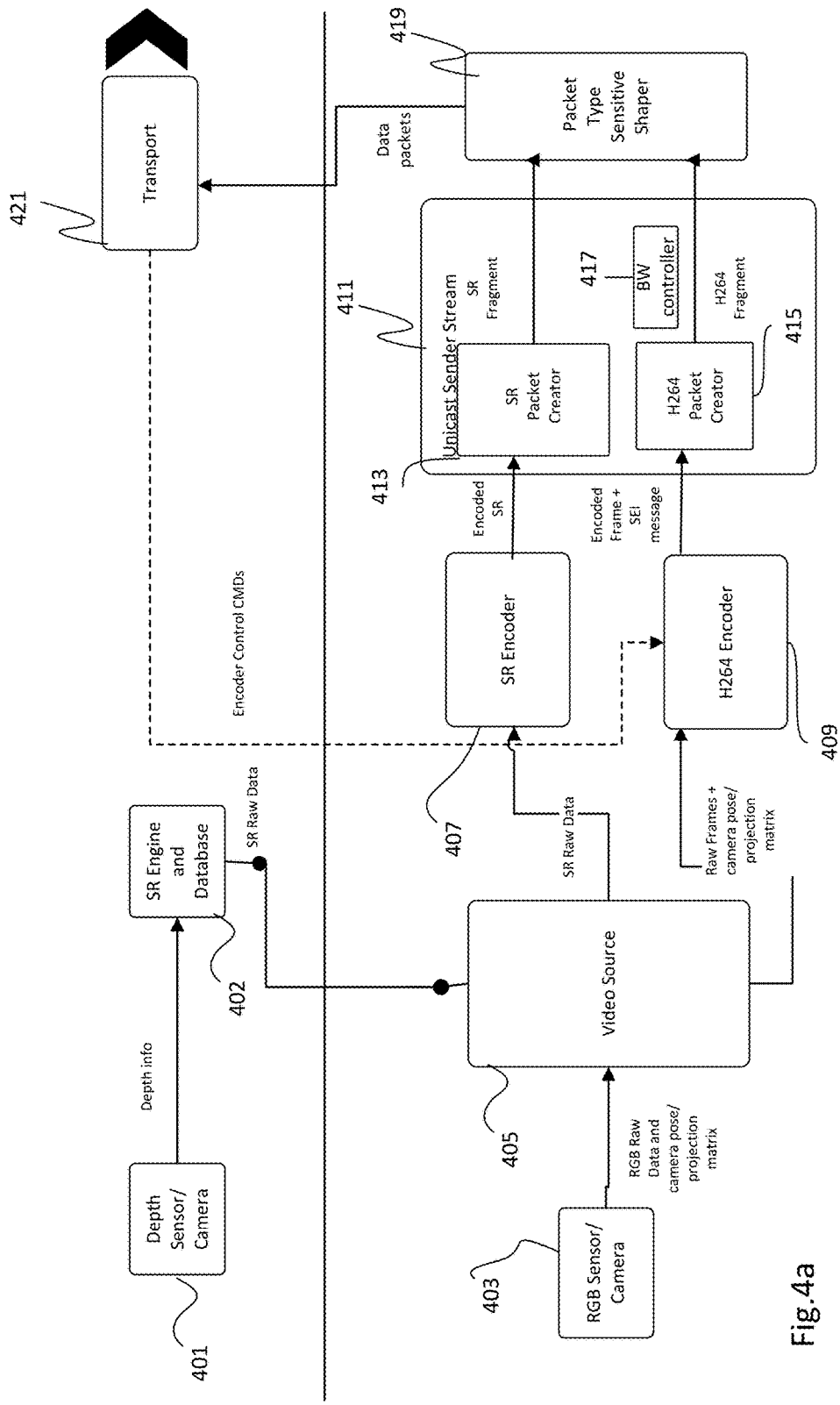
FIGS. 4a and 4b show a schematic view of an example sender and receiver pipeline for combined video and surface reconstruction (SR) data.

With respect to FIG. 4a an example of a suitable sending (media stack) pipeline architecture for the user device. The user device may in such embodiments as described herein be configured to generate image (video data) and surface reproduction (SR) or mesh data.

In the example shown the image used to generate the shared scene is captured by a (Red-Green-Blue) RGB sensor/camera 403. The RGB sensor/camera 403 may be configured to pass the captured RGB raw data and furthermore pass any camera pose/projection matrix information to a suitable device video source 405.

The example architecture shown in FIG. 4a furthermore comprises a depth sensor/camera 401 configured to capture depth information which can be passed to a surface reproduction (SR) engine and database 402. The SR engine and database 402 may be configured to receive the depth information and generate SR raw data according to a known mesh/SR method. The SR raw data can then be passed to the device video source 405.

The video source 405 may be configured to receive the SR raw data and the RGB raw data and any camera pose/projection matrix information. Furthermore the video source 405 may be configured to output the video raw data in the form of SR raw data to a suitable SR channel encoder 407 and the video image data in terms of raw frame and camera pose/projection matrix data to a suitable H.264 channel encoder 409. In the examples described herein the H.264 channel encoder 409 is an example of a suitable video encoder. It is understood that in some other embodiments the video codec employed is any suitable codec. For example the encoder and decoder may employ a High Efficiency Video Coding HEVC implementation.

The SR channel encoder 407 may be configured to receive and to encode the SR raw data to generate suitable encoded SR data. The SR channel encoder 407 may then be configured to pass the encoded SR data to a packet generator 411. Specifically the encoded data may be passed to a SR packet creator 413.

The H.264 channel encoder 409 may similarly be configured to receive the raw image/video frames and camera pose/projection matrix data and process these to generate an encoded frame and SEI (supplemental enhancement information) message data. The encoded frame and SEI message data may be passed to the packet generator 411 and specifically to a H.264 packet creator 415.

Figure 9A:
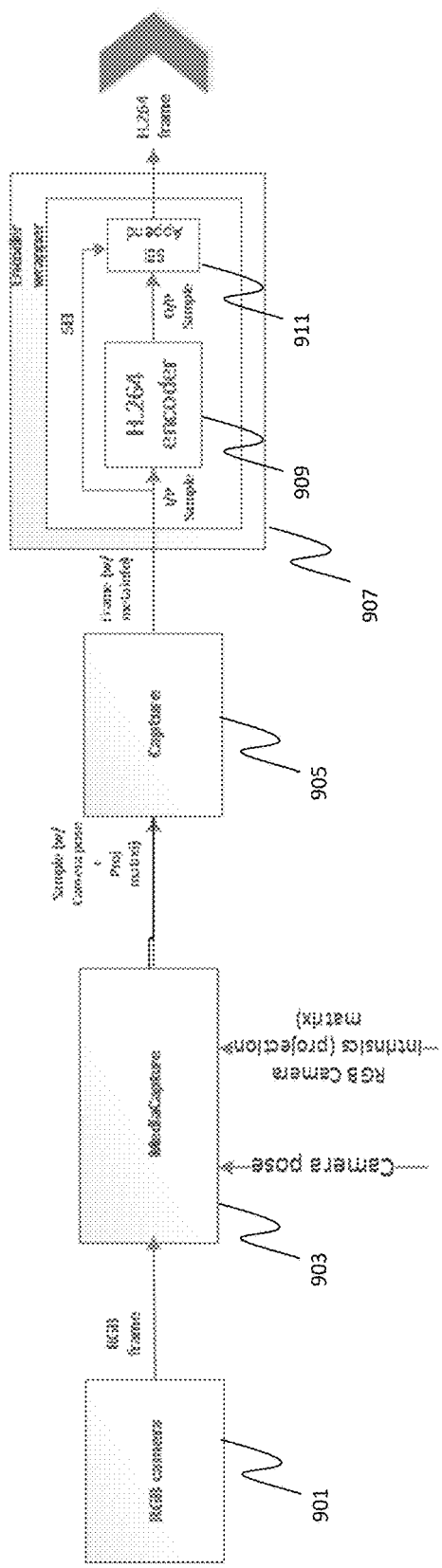
FIGS. 9a and 9b show schematic architecture for embedding and retrieving camera intrinsic and extrinsic data within the image data stream.

With respect to FIG. 9a an example pipeline architecture for the combination of the frame (raw image/video frames) and camera pose/projection matrix information and process these to generate an encoded frame and SEI (supplemental enhancement information) message data is shown. Camera intrinsic (integral to the camera itself) and extrinsic (part of the 3D environment the camera is located in) data or information, such as camera pose (extrinsic) and projection matrix (intrinsic) data, describe the camera capture properties. This information such as frame timestamp and frame orientation should be synchronized with video frames as it may change from frame to frame. The pipeline architecture employed in embodiments such as shown in FIG. 9a should support easy extendibility to other platforms and codec exchangeability.

The concept as described here is to encode the camera intrinsic and extrinsic data in the video channel and carry it in-band as SEI messages. The pipeline architecture should carry the data in a platform agnostic way to the encoder. The application program interface (API) call sequences, for example, are described for the sender pipeline.

As shown in FIG. 9a in order to implement a codec-independent implementation, SEIs may be embedded into the bitstream by the video encoder and read out by the video decoder.

For example the hardware components RGB camera 901 may be configured to generate the RGB frame data. The RGB frame data can then be passed to the OS/Platform layer and to the media capture (and source reader) 903. The media capture entity 903 may furthermore be configured to receive the camera pose and projection matrix and attach these camera intrinsic and extrinsic values as custom attributes. The media sample and custom attributes may then be passed to the media pipeline layer and via a capture entity 905 to a video encoder 907. The video encoder 907 may, for example, be the H.264 channel encoder shown in FIG. 4a. The video encoder 907 may then convey the camera pose and projection matrix in-band as a user data unregistered SEI message. The SEI message may for example be combined in a SEI append entity 911 with the video frame data output from a H.264 encoder 909. An example SEI message is defined below:

```
                          1                   2                   3
   0 1 2 3 4 5 6 7 8 9 0 1 2 3 4 5 6 7 8 9 0 1 2 3 4 5 6 7 8 9 0 1
   F  NR    Type      payloadType     payloadSize      uuid_iso_iec_11578
   I
   uuid_iso_iec_11578
   uuid_iso_iec_11578
   uuid_iso_iec_11578
   uuid_iso_iec_11578                                  T     L     V
   More TLV tuples . . .
``` where

F (1 bit) is a forbidden_zero_bit, such as specified in [RFC184], section 1.3.,

NRI (2 bits) is a nal_ref_idc, such as specified in [RFC6184], section 1.3.,

Type (5 bits) is a nal_unit_type, such as specified in [RFC6184], section 1.3. which in some embodiments is set to 6., payloadType (1 byte) is a SEI payload type and in some embodiments is set to 5 to indicate a User Data Unregistered SEI message. The syntax used by this protocol is as defined in [ISO/IEC14496-10:2010], section 7.3.2.3.1., payloadSize (1 byte) is a SEI payload size. The syntax that is used by this protocol for this field is the same as defined in [ISO/IEC14496-10:2010], section 7.3.2.3.1. The payloadSize value is the size of the stream layout SEI message excluding the F, NRI, Type, payloadType, and payloadSize fields., uuid_iso_iec_11578 (16 bytes) is a universally unique identifier (UUID) to indicate the SEI message is the stream layout and in some embodiments is set to {0F5DD509-CF7E-4AC4-9E9A-406B68973C42}., T (1 byte) is the type byte and in some embodiments a value of 1 is used to identify camera pose info and a value of 2 is used to identify camera projection matrix info., L (1 byte) is the length in bytes of the subsequent value field minus 1 and has a valid value range of 0-254 indicating 1-255 bytes., V (N byte) is the value and the length of the value is specified as the value of the L field.

The concept associated with the packet generator 411 is to control the packaging of the video and the SR data in order that the receiver of the data is able to produce a reliable and effective mixed reality experience.

The packet generator 411 may for example comprise a SR packet creator 413. The SR packet creator 413 may be configured to generate SR fragment packets which can be passed to the packet type sensitive shaper 419. The SR packet creator 413 furthermore may be controlled for retransmission feedback purposes. In some embodiments using a NACK method for retransmission feedback may not be suitable and therefore an ACK method may be implemented.

The SR packet creator 413 may therefore in some embodiments be configured to hold references of any SR data packets in a pending buffer until they are sent. Once the packets are sent, the references may then be moved to an unacknowledged buffer.

In such embodiments the unacknowledged buffer may have a window size that limits the traffic between sender and receiver.

The references of the SR data packets may then be maintained until the receiver acknowledges that the packets are received.

In some embodiments the unacknowledged buffer window size may be dynamically adjusted according to receiver buffer depth. In some embodiments the unacknowledged buffer window size may be a static value, for example 32.

In some embodiments the SR packet creator 413 may be configured to keep sending SR data packets from the pending buffer when the SR frame arrives, even when there is no feedback message (for example a message comprising an AcknowledgmentBitMap) received. Implementing a keep sending method means that starvation at the receiver should not occur.

The feedback message may comprise a value (for example a value baseSequence in the AcknowledgmentBitMap message). An increasing value implies that all packets up to and including value-1 (baseSequence-1) have been acknowledged by the receiver.

In some embodiments the SR packet creator 413 may be configured to send data packets beyond a learned receiver buffer depth only when there is enough bandwidth.

In some embodiments the sending speed may be limited by RTT (round trip time) of the two way channel. For example when the unacknowledged buffer window size is 128 packets, and the RTT is 200 ms, and the MPU (Maximum Packet Unit applied to SR data fragmentation) is 1000, then the maximum sending speed would be limited to 128*1000*(1000/200)=5000 kb/s.

Thus in some embodiments the unacknowledged buffer window size, along with length of the (AcknowledgmentBitMap) feedback message may be adjusted to change the maximum rate.

Similarly the packet generator 411 may comprise a H.264 packet creator 415. The H.264 packet creator 415 may be configured to generate suitable H.264 packet fragments and pass these packet fragments to the packet type sensitive shaper 419.

The packet generator 411 may furthermore comprise a bandwidth (BW) controller 417 configured to control the generation and output of the packet fragments. The BW controller 417 may be responsible for splitting bandwidth allocations between the SR packet creator 413 and H.264 packet creator 415. In some embodiments the BW controller 417 maintains a minimum bandwidth for video.

In some embodiments the BW controller 417 may be configured to initially allocate data evenly between every parallel channel running concurrently. For example the data split may start at 50/50 for a single H.264 channel and a single SR channel. However the BW controller 417 may be configured to determine or estimate short-term and long-term averages for H.264 and SR bandwidth requirements after a determined time period. For example short-term and long-term averages for the H.264 and SR bandwidth requirements may be determined after 2.5 seconds.

It should be noted that there is a difference in behaviour between these values between the H.264/video and SR bandwidths. For the video the bandwidth values are an allocation which is passed to and should be respected by the H.264 (video) encoder 409. While the SR bandwidth values may be an observation of the bandwidth used by the SR channel and which the media platform may monitor to determine how to adjust a level-of-detail parameter within the SR encoder 407.

The packet sensitive shaper 419 may then be configured to receive the SR packet fragments and H.264 packet fragments and generate suitable data packets which are passed to the transport 421. The packet sensitive shaper 419 may be a (network traffic) shaper that is aware of different real-time requirement of H.264 and SR data packets. For example the shaper may be implemented as a round-robin between H.264 and SR packets.

The transport 421 receives the data packets and outputs of these via a suitable output stream.

Figure 4B:
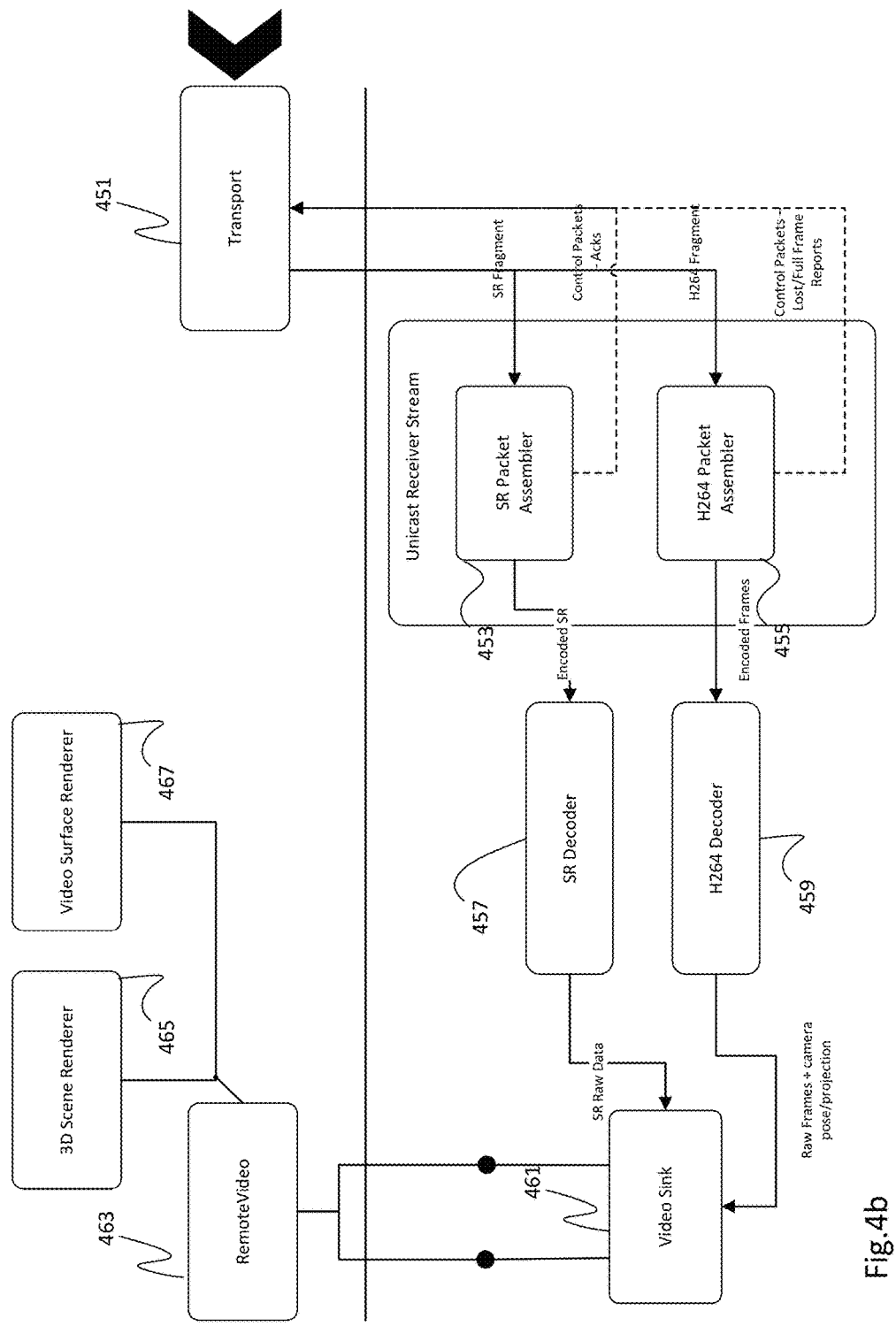

With respect to FIG. 4b a suitable receive pipeline (media stack) architecture for the user device configured to receive image (video data) and surface reproduction (SR) or mesh data is shown.

The user device may comprise a P2P transport 451 configured to receive the video stream data and pass this information to a receiver/packet assembler.

The packet assembler may comprise a SR packet assembler 453 and a H.264 packet assembler 455. The SR packet fragments may be passed to the SR packet assembler 453 for generating encoded SR data packets. The H.264 packet assembler 455 may be configured to receive the H.264 packet fragments and generate encoded frame data.

The SR packet assembler 453 may be configured to generate a suitable feedback message (for example an AcknowledgmentBitMap feedback message) which may be sent to the SR packet creator in order to control the retransmission of the SR data. The feedback message may be generated when a content start event is detected (for example when the SR1_CONTENT_START_FLAG is detected), or when a content stop event is detected (for example when the SR1_CONTENT_STOP_FLAG is detected), or when an end of file event is detected (for example when the SR1_CONTENT_EOF_FLAG is detected). Furthermore in some embodiments the feedback message is generated when a new SR packet arrives at SR packet assembler 453 and a predetermined time period (for example 250 ms) has passed since the previous packet. In some embodiments the feedback message is generated for every 7th (or other determined number) received packet. In some embodiments the determined number of packet may include retransmitted packets. Furthermore in some embodiments the feedback message may be generated after the feedback value indicating the last received packet (baseSequence) has advanced by a determined number (for example 7) packets. In some embodiments the feedback message is generated when an error is reported by a SR decoder 457.

As described herein the SR packet creator is configured to receive the feedback message (AcknowledgmentBitMap) and control the retransmission of buffered packets.

The encoded SR data packets may then be passed to a SR channel decoder 457 to generate SR raw data.

The H.264 channel decoder 459 may be configured to receive the encoded frames from the H.264 packet assembler 455 and output suitable raw frames and camera pose/projection matrix data. The SR raw data and the raw frames and camera pose/projection information can then be passed to a video sink 461.

The video sink 461 may then be configured to output the received SR raw data and the raw frames and camera pose/projection data to any suitable remote video applications 463 or libraries for suitable 3D scene rendering (at a 3D scene renderer 465) and video service rendering (at a video surface renderer 467).

Figure 9B:
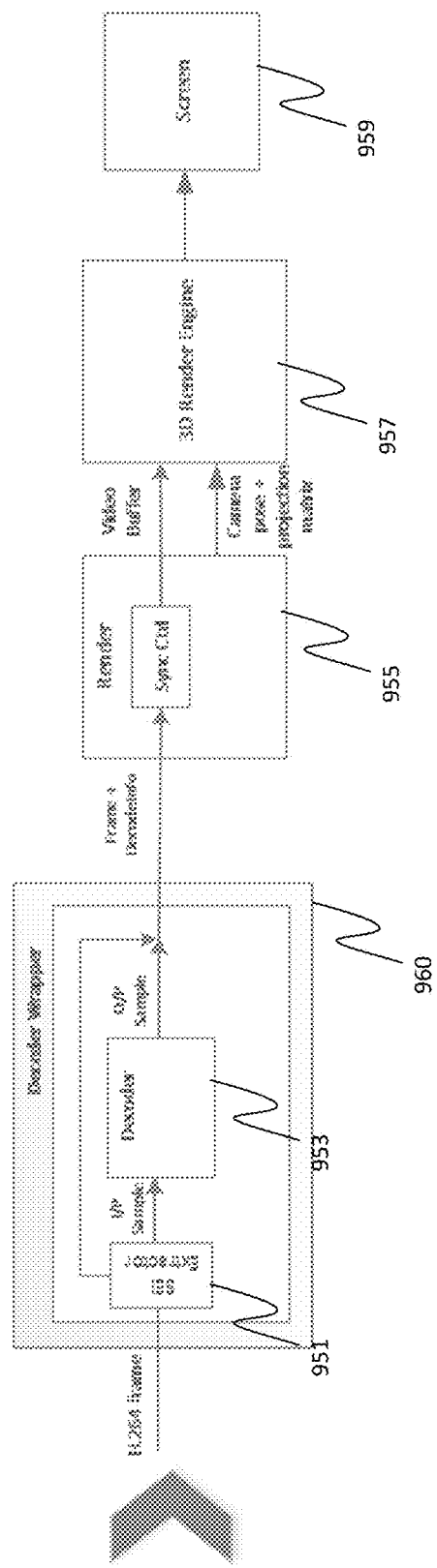

With respect to FIG. 9b an example pipeline architecture for the extraction of raw image/video frames and camera intrinsic and extrinsic data (such as pose/projection matrix data) from encoded frame and SEI (supplemental enhancement information) message data is shown. This pipeline architecture is the reverse of the process performed by the example pipeline architecture shown in FIG. 9a.

The media pipeline layer may, for example, comprise the video decoder 960. This in some embodiments is implemented by the H.264 channel decoder 459 such as shown in FIG. 4b. The video decoder 960 may comprise a SEI extractor 951 configured to detect and extract from the H.264 frame data any received SEI data associated with the camera intrinsic and extrinsic data values (the camera pose and/or projection matrix data). This may be implemented within the video (SLIQ) decoder by the decoder scanning the incoming network abstraction layer units (NALUs) and extracting camera intrinsic and extrinsic data (if present) from the SEI message appended with each frame. The camera intrinsic and extrinsic data may then be made available to the decoder extension and the decoder callback via decoder options.

The video decoder, for example the H.264 decoder 953, may then decode a H.264 bitstream not containing the SEI message.

The media pipeline layer may further comprise a renderer 955 configured to synchronise the intrinsic and extrinsic data and the frame data and pass it to the OS/platform layer.

The OS/platform layer may furthermore as shown in FIG. 9b comprise a 3D render engine 957 configured to convert the video frame image and with the intrinsic and extrinsic data and the SR data generate a suitable 3D rendering suitable for passing to a display or screen 959. It is understood that the 3D render engine may be implemented as an application in some embodiments.

In implementing architecture such as described herein a MR scene in the form of video or image data and the data required to generate a 3D rendering of the scene may be transferred from one device to the other reliably and using the available bandwidth effectively.

As described herein one of the aspects of MR is the ability to share and annotate a captured scene. For example the video captured by one participant in the scene may be annotated by the addition of an object. The object may be located in the scene with a defined location and/orientation. Furthermore the object as described herein may be associated with a media type—such as video, image, audio or text. The object may in some situations be an interactive object in that the object may be movable, or changed. For example the interactive object may be associated with a video file and when the object is 'touched' or selected by a participant the video is played to all of the participants sharing the scene.

The adding, removing and modifying objects within a scene may be problematic. However these problems may be handled according to the example architectures and protocols for object information described in further detail herein.

Figure 5A:
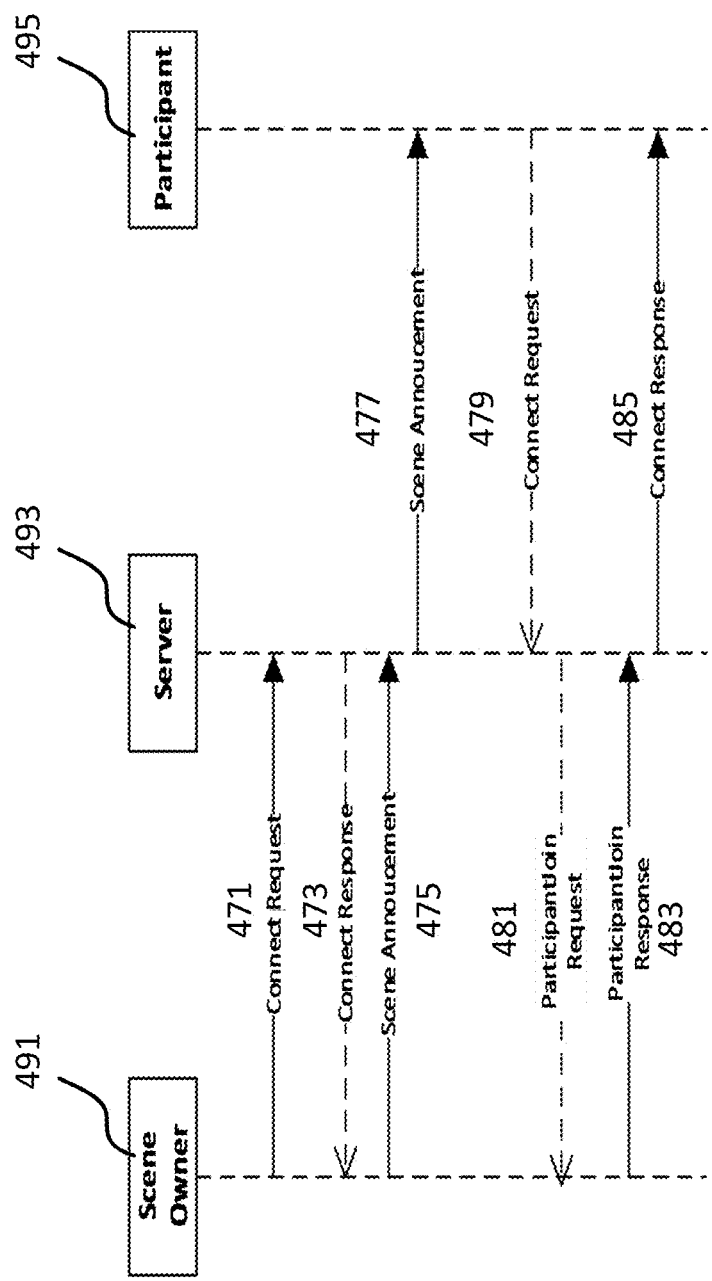
FIG. 5a shows a schematic view of an example endpoint architecture for object handing within a shared scene.

With respect to FIG. 5a an example architecture showing protocol endpoints suitable for handling interactive object and sharing mixed reality (MR) scenes with other participants is shown. In the example shown in FIG. 5a (and the examples described therein) a scene owner 491 is a protocol endpoint sharing its mixed reality scene with other participants. For example the scene owner 491 may comprise a user operating a user device such as shown in FIG. 3 and capturing the environment of the user A. The scene owner may also be allowed to add, remove and manipulate (virtual) objects (also known as annotations) to the scene view. The addition, removal or manipulation of the objects may in some embodiments be implemented using the user interface.

A scene participant 495 may be a protocol endpoint which is configured to receive the mixed reality scene generated by the scene owner 491. The scene participant 495 may further be configured to be able to add, remove, and manipulate objects in the scene.

The visualisation, location and interaction with such objects in a shared scene as described previously may present problems. An object may have a visual representation and have associated content (such as audio/video/text). A participant may, for example, place a video player object in a shared scene, and interact with it to start playing a video for all participants to watch. Another participant may attempt to interact with the same object to control the playback or to change the position of the object in the scene. As such the object should appear at the same position relative to the real-world objects within the video or image and other (virtual) objects for all of the participants.

Furthermore the state of the object should also be consistent, subject to an acceptable delay, for all of the participants. Thus for example the video object when playing a video for all the participants should display the same video at approximately the same position.

The shared scene or mixed reality application should also be implemented such that a participant joining the collaboration session at any time is able to synchronise their view of the scene with the views of the other participants. In other words the scene is the same for all of the participants independent of when the participant joined the session.

Similarly the mixed reality application should be able to enable a scene to be paused or snapshot so that the session may be suspended and may then be resumed at a later time by restoring the snapshot. In other words the scene should have persistence even when no users are using it.

The architecture described herein may be used to implement a message protocol and set of communication mechanisms designed to efficiently meet the requirements described above. The concept can therefore involve communication mechanisms such as 'only latest reliable message delivery' and 'object-based' flow control. The implementation of 'only latest message delivery' may reduce the volume of transmitted and/or received object information traffic and therefore utilise processor and network bandwidth efficiently. This is an important and desirable achievement for mobile and wearable devices where minimising processor utilisation and network bandwidth is a common design goal. Similarly object-based flow control allows a transmitter and receiver to selectively limit traffic requirements for synchronising the state of a given object.

As shown in FIG. 5a, in some embodiments, a scene server 493 protocol endpoint may be employed. The scene server 493 may be configured to relay messages between the scene owner 491 and the participants 495.

The scene owner 491, participant 495, or server 493 may employ an application (or app) operating as a protocol client entity. The protocol client entity may be configured to control a protocol end point for communicating and controlling data flow between the protocol end points.

In the following examples the object message exchange is performed using a scene server mediated architecture such as shown in FIG. 5a. In other words messages pass via a scene server 493 which forwards each message to its destination. As shown in FIG. 5a the scene server can be seen as a protocol endpoint separate from the scene owner 491 or participant 495. However the scene server 493 may be implemented within one of the scene owner user device, participant user devices or a dedicated server device.

It is understood that in some embodiments the message exchange is performed on a peer to peer basis. As the peer to peer message exchange case is conceptually a special case of the server mediated case where the scene owner endpoint and server endpoint are co-located on the same device then the following examples may also be applied to peer to peer embodiments.

The data model herein may be used to facilitate the description of the protocol used to synchronise the objects (or annotations) described herein. At each protocol endpoint (such as the scene server, scene owner, and participant) a session management entity or session management entity application may maintain a view of the shared scene. The view of the scene may be a representation of the objects (or annotations) within the scene. The object representation may comprise data objects comprising attributes such as object type, co-ordinates, and orientation in the space or scene. The protocol endpoints may then use the session management entity application to maintain a consistent scene view using the object representations. In such a manner any updates to the representation of a scene object can be versioned and communicated to other endpoints using protocol messages. The scene server may relay all of these messages and discard updates based on stale versions where applicable.

The protocol for exchanging messages can be divided into a data plane and a control plane. At each protocol endpoint the data plane may implement a message delivery entity application and a packet delivery entity application which are responsible for maintaining message queues/packet queues and keeping track of the delivery status of queued transmit and/or receive messages and packets. In the following embodiments an outstanding outbound message is one that has been transmitted but not yet acknowledged by the receiver. An outstanding inbound message is a message that has been received but has not been delivered to the local endpoint (for example the session management entity).

The control plane claim can be implemented within the scene server endpoint and may be configured to maintain the state of the scene between the scene owner and other participants. For example the scene server 493 may be configured to maintain the protocol version and endpoint capabilities for each connected endpoint.

With respect to FIG. 5a an example of the message protocol involved in the initialisation of a shared scene mixed reality application comprising object information is shown.

In the following examples the scene owner 491 may be configured to create an endpoint using the protocol client entity and obtain the address of a server endpoint 493. The address determination may be through a static configuration address or through domain name system (DNS) query.

The protocol client entity application may then assert itself as the scene owner by issuing a connect request message and transmitting the connect request message to the server 493 to register the scene for sharing.

The operation of transmitting a connect request message from the scene owner 491 to the server 493 is shown in FIG. 5a by step 471.

The server 493 may then respond to the scene owner 491 with a suitable acknowledgement message.

The operation of the server transmitting an acknowledgement message to the scene owner 491 is shown in FIG. 5a by step 473.

The scene owner 491 may then be configured to generate a scene announcement message and transmit this to the server 493.

The operation of transmitting the scene announcement message is shown in FIG. 5a by step 475.

The server 493 may then relay the scene announcement message to invitees. In other words the scene announcement message may comprise addresses or suitable user identifiers which are used by the server to send the scene announcement messages to the correct locations.

The operation of sending the scene announcement message from the server 493 to the participant 495 is shown in FIG. 5a by step 477.

The participant endpoint may then use its protocol client application generate a connect request message and transmit the message to the server 493 to register interest in joining the scene.

The operation of transmitting a connect request message is shown in FIG. 5a by step 479.

The server 493 can then forward the connect request or generate a participation request message and transmit the message to the scene owner 491.

The operation of transmitting a participation request message from the server 493 to the scene owner 491 is shown in FIG. 5a by step 481.

The scene owner 491 may then determine whether or not the participant is authorised to participate and generate a participation response message. The participation response message may then be transmitted to the server 493.

The operation of transmitting a participation response message from the scene owner 491 to the server 493 is shown in FIG. 5*a* by step 483.

The server 493 may then be configured to generate a connect response message from the participation response message and transmit the connect response message to the participant 495.

The operation of transmitting the connect response message 485 is shown in FIG. 5*a* by step 485.

The server and other endpoints may maintain suitable timers. For example a connect/join state machine timer may be used to at the two endpoints exchanging the connect/join messages. Furthermore keepalive timers may be employed in some embodiments to trigger the sending of keepalive messages. Similarly retransmission timers may be implemented to trigger retransmission only for reliable messages.

Figure 5B:
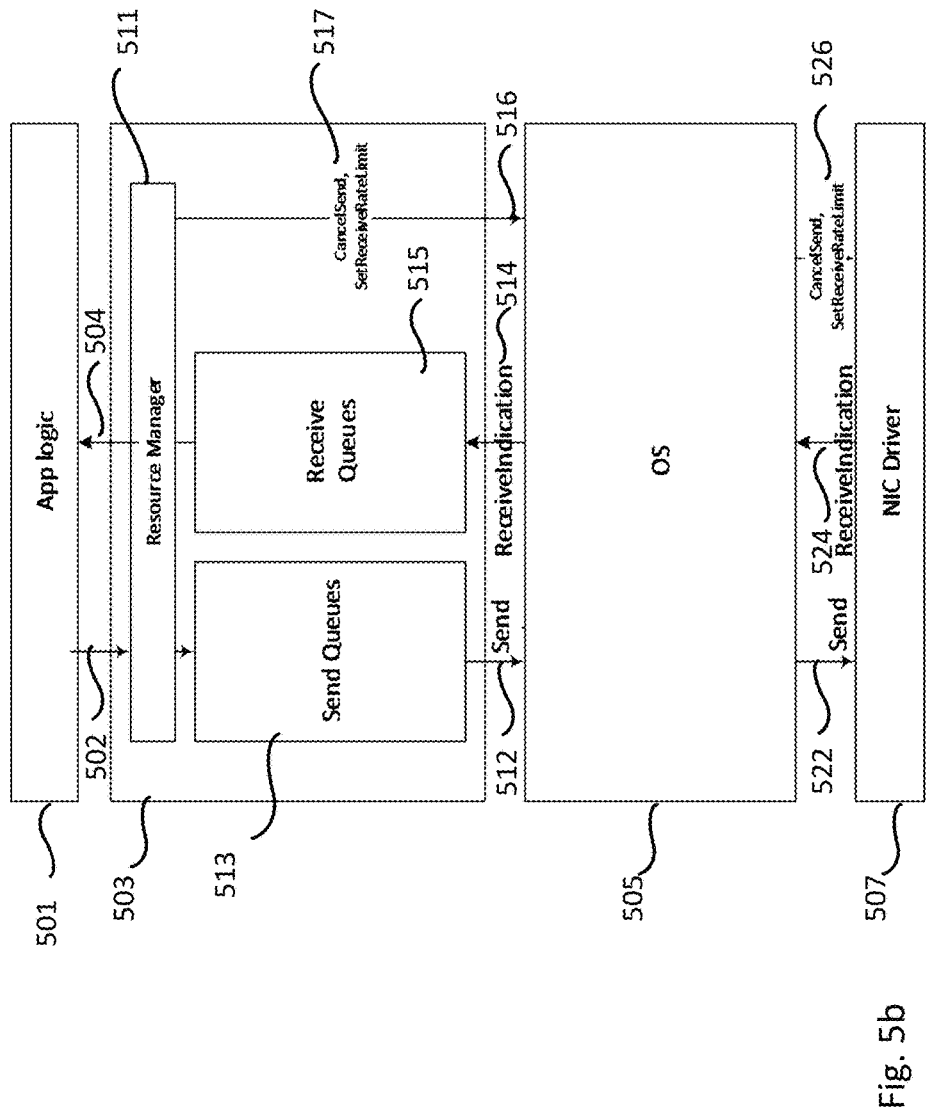
FIG. 5b shows a schematic view of an example architecture handling protocols for synchronising object updates.

With respect to FIG. 5*b* the control architecture within the user device is shown in further detail. The logic layer 501, which can comprise any suitable application handling object information such as the session management entity application, the message delivery entity application, the packet delivery entity application and the connection state entity application.

The logic layer 501 may be configured to communicate with an I/O or client layer 503 via a (outbound) send path 502 and (inbound) receive path 504.

The I/O or client layer 503 may comprise a resource manager 511. The resource manager may control the handling of object data. Furthermore the resource manager may be configured to control an (outbound message) sending queue 513 and (inbound message) receiving queue 515.

Furthermore the resource manager 511 may be configured to transmit control signals to the OS layer 505 and the NIC driver 507. These control signals may for example be CancelSend and/or SetReceiveRateLimit signals 517 which may be sent via control pathways 516, 526 to the OS layer 505 and NIC driver 507.

The send queue 513 may be configured to receive packets from the resource manager and send the packets to the OS layer by the sent pathway 512. The receive queue 515 may be configured to receive messages from the OS layer 505 via the receive pathway 514.

The OS layer 505 may receive outbound messages from the send queue 513 and pass these via a send path 522 to the NIC driver 507. Furthermore the OS layer 505 can receive messages from the NIC driver 507 by a receive path 524 and further pass these to the receive queue 515 via a receive pathway 514.

Figure 6:
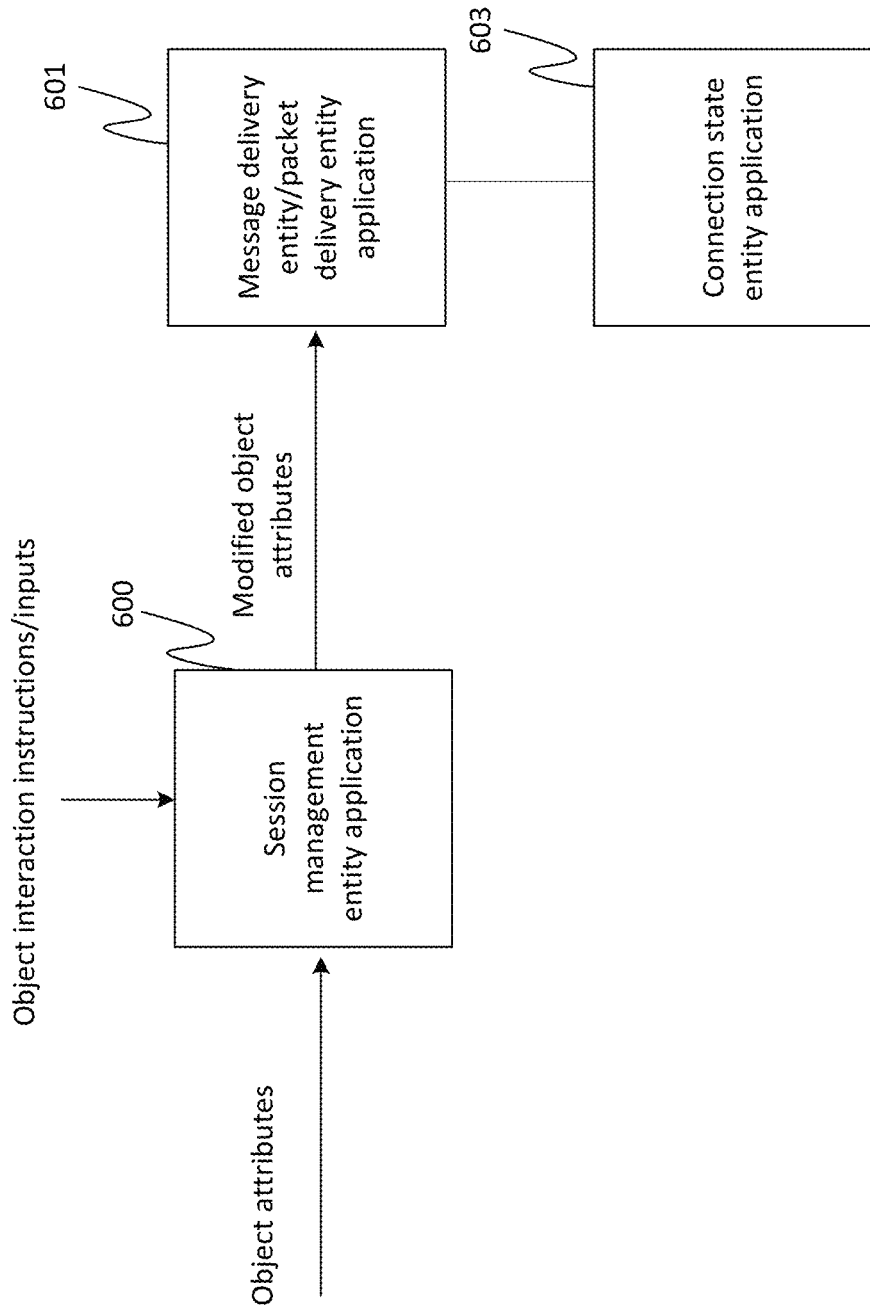
FIG. 6 shows schematic example communication between a session management entity application and a message delivery entity/packet delivery entity application executed on the protocol endpoint.

With respect to FIG. 6 examples of the interaction of the session management entity application 600 and the message delivery entity and packet delivery entity 601 and connection state entity 603 are shown in further detail.

The session management entity 600 may be configured to maintain or receive the object representation attributes and furthermore detect when any object interaction instructions are received. For example a user may move or interact with an object causing one of the attributes of the object to change. The session management entity 600 may be configured to process the object interaction instructions/inputs and generate or output modified object attributes to be passed to the message delivery entity/packet delivery entity 601. Furthermore the connection state entity application 600 may be configured to control the message delivery entity/packet delivery entity.

Figure 7:
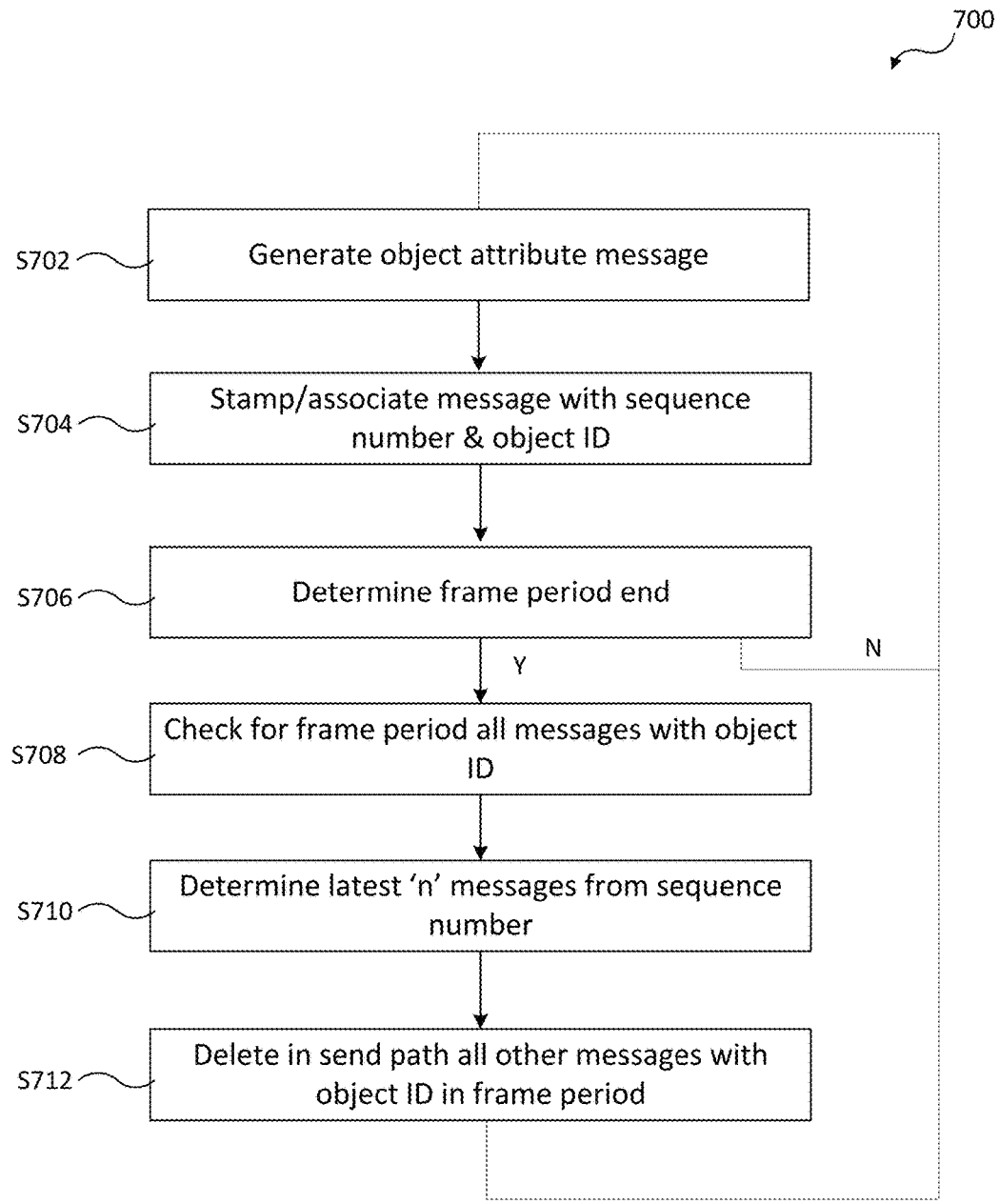
FIG. 7 shows a flow chart for a process of send path object message control within a user device.

Thus, for example, FIG. 7 shows an example flow diagram 700 showing an operation of the message delivery entity/packet delivery entity 601 for the send path. In this example the session management entity 600 may generate a new or modified object attribute message.

The operation of generating an object attribute message is shown in FIG. 7 by step S702.

The object attribute message may be passed to the message delivery entity/packet delivery entity and the message is stamped or associated with a sequence number and object identify value. The object identify value may identify the object and the sequence number identify the position within a sequence of modifications.

The operation of stamping/associating the message with a sequence number and an object ID value is shown in FIG. 7 by step S704.

The message delivery entity/packet delivery entity 601 may then be configured to determine whether a video frame period or other video frame related period has ended.

The operation of determining the frame or period end is shown in FIG. 7 by step S706.

When the period has not ended then the method can pass back to the operation of generating the next modified object attribute message.

However when a frame or period has be determined then the message delivery entity/packet delivery entity may be configured to check for the current video frame or period all of the messages with a determined object identifier value.

The operation of checking for the frame or period all the messages with the determined object identifier is shown in step S708.

The message delivery entity/packet delivery entity 601 may then be configured to determine the latest number of messages (or a latest message) from the messages within the frame period or other period based on the sequence number.

The operation of determining the latest messages based on the sequence numbers is shown in FIG. 7 by step S710.

The message delivery entity/packet delivery entity 601 may then be configured to delete in the send path all of the other messages with the object identify value for that specific frame period or other period.

The deletion of all other object attribute messages with the object ID in the frame period or other period is shown in FIG. 7 by step S712.

The method can then pass back to checking for further object interaction instructions or inputs.

In implementing such embodiments the message flow of object attribute messages for a specific object for a given video frame period or other period can be controlled such that there is a transmission of at least one message updating the state or position of a given object but the network is not flooded with messages. Furthermore the Send Path API may be made available at all layers for the application to discard excess messages queued with the send path for a given object ID.

Furthermore in some embodiments the sender may be configured to provide feedback about attempted or cancelled transmissions.

The server in implementing such embodiments as described above may be configured to provide or perform application layer multicasting without exceeding the receivers' message rate limits.

Figure 8:
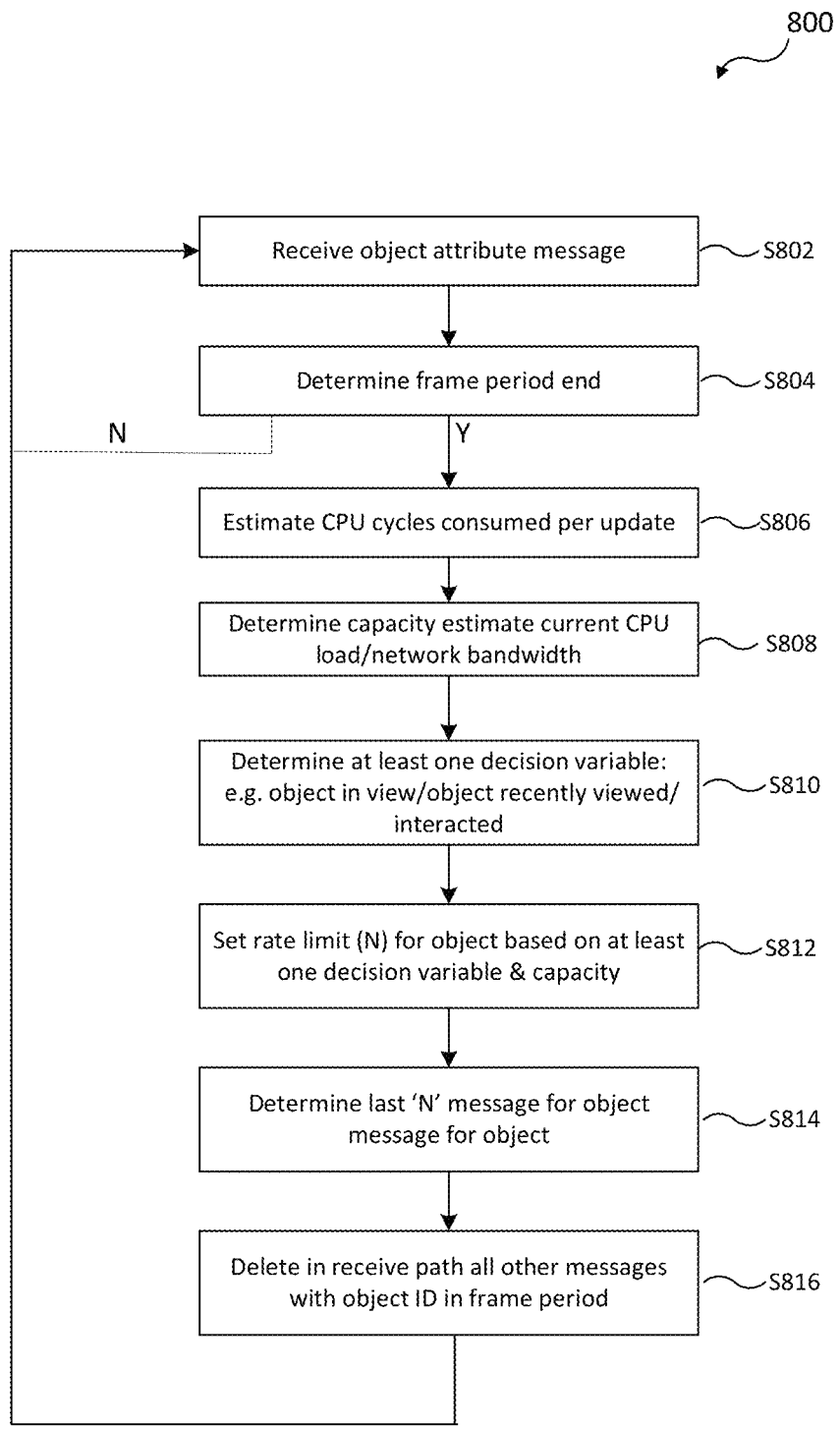
FIG. 8 shows a flow chart for a process of receive path object message control within a user device.

With respect to FIG. 8 an example flow diagram 800 showing an operation of the message delivery entity/packet delivery entity 601 for the receive path is shown. The receive path refers to all incoming queue stages with the application's transport layer entities at the endpoints, the underlying operating system and the network driver.

In some embodiments object attribute messages such as described with respect to the send path are received.

The operation of receiving an object attribute message is shown in FIG. 8 by step S802.

The message delivery entity/packet delivery entity 601 may furthermore be configured to determine whether or not a video frame period (or other determined period) has ended.

The operation of determining the end of a determined frame (or other period) is shown in FIG. 8 by step 804.

When the period has not ended then the method may loop back to receive further object attribute messages.

When the period has ended then the connection state entity application 603 may then be configured to determine some parameter estimation and decision variables on which the control of receive messages may be made.

For example in some embodiments the connection state entity application 603 may be configured to determine the number of CPU cycles required or consumed per update process.

The operation of estimating the CPU cycles consumed per update is shown in FIG. 8 by step S806.

In some embodiments the connection state entity application 603 may be configured to determine or estimate a current CPU load and/or the network bandwidth.

The operation of determining the current CPU load/network bandwidth is shown in FIG. 8 by step S808.

Furthermore in some embodiments the connection state entity application 603 may be configured to determine an object priority for a specific object. An object priority can be, for example, based on whether the object is in view, whether the object has been recently viewed, or the object has been recently interacted with.

The operation of determining at least one decision variable is shown in FIG. 8 by step S810.

The connection state entity application 603 may then in some embodiments be configured to set a 'rate limit' for object updates based on at least one of the determined variables and the capacity determination.

The operation of setting the rate limit is shown in FIG. 8 by step S812.

The message delivery entity/packet delivery entity 601 may then be configured to determine the last 'n' messages for the object within the period, where 'n' is the rate limit. This may for example be performed by determining the last 'n' sequence numbers on the received messages for the object ID over the period.

The operation of determining the last 'n' message is shown in FIG. 8 by step 814.

The application can then delete in the received path all of the messages for that object ID for that period other than the last 'n' messages.

The operation of deleting all of the other messages in the period with the object ID is shown in FIG. 8 by step S816.

The method may then pass back to the operation of receiving further object messages.

In such a manner the receiver is not overloaded with object attribute messages.

Whilst embodiments have been described with reference to interactions being made by a user to an object located with respect to frames of incoming live video, embodiments of the present disclosure extend to interactions over images generated by a computer.

Generally, any of the functions described herein can be implemented using software, firmware, hardware (e.g., fixed logic circuitry), or a combination of these implementations. The terms "controller", "functionality", "component", and "application" as used herein generally represent software, firmware, hardware, or a combination thereof. In the case of a software implementation, the controller, functionality, component or application represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

According to a first aspect of the disclosure there is a user device within a communication architecture, the user device comprising: an image capture device configured to determine image data for the creation of a video channel defining the shared scene; an intrinsic/extrinsic data determiner configured to determine intrinsic/extrinsic capture device data associated with the image capture device; and a video encoder configured to encode the image data and intrinsic/extrinsic capture device data within the video channel.

The video encoder may comprise: a frame encoder configured to encode the image data as image frames; and a supplemental enhancement information appender configured to encode the intrinsic/extrinsic capture device data as a supplemental enhancement information message appended to the image frames.

The image capture device may comprise: a camera input configured to receive RGB frame data; and a media capture entity configured to generate image data from the RGB frame data.

The media capture entity is further configured to receive the intrinsic/extrinsic capture device data and associate the intrinsic/extrinsic capture device data with the image data.

The intrinsic/extrinsic capture device data may comprise camera projection matrix data.

The intrinsic/extrinsic capture device data may comprise camera pose data.

According to a first aspect of the disclosure there is a user device within a communication architecture, the user device comprising: a receiver configured to receive a video channel comprising image data for the shared scene determined from an image capture device and intrinsic/extrinsic capture device data associated with the image capture device; and a video decoder configured to extract and decode the image data and the intrinsic/extrinsic capture device data associated with the image capture device from the video channel.

The video channel may comprise a frame encoded video data stream, wherein the video decoder may comprise: a frame decoder configured to frame decode the encoded video data stream; and a supplemental enhancement information extractor configured to extract and decode supplemental enhancement information messages from within the encoded video data stream.

The supplemental enhancement information extractor may comprise: a scanner configured to proxy scan incoming network abstraction layer units; and an extractor configured to extract intrinsic/extrinsic capture device data from the supplemental enhancement information message appended with each frame.

According to a third aspect of the disclosure there is a method implemented at a user device within a communication architecture, the method comprising: determining image data from an image capture device for the creation of a video channel defining the shared scene; determining intrinsic/extrinsic capture device data associated with the image capture device; and encoding the image data and intrinsic/extrinsic capture device data within the video channel.

Encoding the image data and intrinsic/extrinsic capture device data within the video channel may comprise: encoding the image data as image frames; and encoding the intrinsic/extrinsic capture device data as a supplemental enhancement information message appended to the image frames.

According to a fourth aspect of the disclosure there is a method implemented at a user device within a communication architecture, the method comprising: receiving a video channel comprising image data for the shared scene determined from an image capture device and intrinsic/extrinsic capture device data associated with the image capture device; extracting and decoding the image data from the video channel; and extracting the intrinsic/extrinsic capture device data associated with the image capture device.

The video channel may comprise a frame encoded video data stream, wherein extracting and decoding the image data from the video channel comprises frame decoding the encoded video data stream, and extracting the intrinsic/extrinsic capture device data associated with the image capture device comprises extracting and decoding supplemental enhancement information messages from within the encoded video data stream.

According to a fifth aspect of the disclosure there is a computer program product, the computer program product being embodied on a non-transient computer-readable medium and configured so as when executed on a processor of a user device within a communication architecture, to: determine image data from an image capture device for the creation of a video channel defining the shared scene; determine intrinsic/extrinsic capture device data associated with the image capture device; and encode the image data and intrinsic/extrinsic capture device data within the video channel.

According to a sixth aspect of the disclosure there is a computer program product, the computer program product being embodied on a non-transient computer-readable medium and configured so as when executed on a processor of a user device within a communication architecture, to: receive a video channel comprising image data for the shared scene determined from an image capture device and intrinsic/extrinsic capture device data associated with the image capture device; extract and decode the image data from the video channel; and extract the intrinsic/extrinsic capture device data associated with the image capture device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user device within a communication architecture, the user device comprising:
    an image capture device configured to capture image data for use in creation of a video channel defining a shared scene that includes at least one interactive object associated with a media type, the shared scene configured for viewing by and interaction with users of different user devices;
    an intrinsic/extrinsic data determiner configured to determine intrinsic capture device data associated with the image capture device and extrinsic capture device data associated with the captured image data, the intrinsic capture device data and the extrinsic capture device data being separate from the image data;
    a video encoder configured to encode the image data intrinsic capture device data, and the extrinsic capture device data within the shared scene for transmission to the different user devices, wherein the intrinsic capture device data and the extrinsic capture device data are encoded as one of a supplemental enhancement information (SEI) message or custom attribute values appended to image frames of the image data;
    a display device configured to display a user interface that enables a user to apply at least one annotation to the shared scene by manipulating the at least one interactive object or adding an additional interactive object to the shared scene; and
    a session management entity configured to generate data objects describing the at least one annotation to the shared scene and communicate the generated data objects to the different user devices to synchronize a view of the shared scene for the users of the different devices.

2. The user device of claim 1, wherein the intrinsic capture device data and the extrinsic capture device data are encoded as the supplemental enhancement information message, and the video encoder comprises:
    a frame encoder configured to encode the image data as the image frames; and
    a supplemental enhancement information appender configured to encode the intrinsic capture device data and extrinsic capture device data as the supplemental enhancement information message and append the supplemental enhancement information message to the image frames.

3. The user device of claim 1, wherein the image capture device comprises:
    a camera input configured to receive RGB frame data; and
    a media capture entity configured to generate image data from the RGB frame data.

4. The user device of claim 3, wherein the intrinsic capture device data and the extrinsic capture device data are encoded as custom attribute values and the media capture entity is further configured to receive the intrinsic capture device data and the extrinsic capture device data and to append the custom attribute values including the intrinsic capture device data and the extrinsic capture device data to the generated image data.

5. The user device of claim 1, wherein the intrinsic capture device data comprises camera projection matrix data.

6. The user device of claim 1, wherein the extrinsic capture device data comprises camera pose data.

7. A user device within a communication architecture, the user device comprising:
  a receiver configured to receive a video channel comprising image data for a shared scene determined from an image capture device, the shared scene configured for viewing by and interaction with users of different user devices and the image data comprising intrinsic capture device data associated with the image capture device and extrinsic capture device data associated with the captured image data, the intrinsic capture device data and the extrinsic capture device data being separate from the image data;
  a video decoder configured to extract and decode the image data, the intrinsic capture device data, and the extrinsic capture device data from the video channel, wherein the intrinsic capture device data and the extrinsic capture device data are extracted and decoded as one of a supplemental enhancement information (SEI) message appended to image frames of the image data or custom attribute values appended to image frames of the image data;
  a display device configured to display a user interface that enables a user to apply at least one annotation to the shared scene by manipulating the at least one interactive object or adding an additional interactive object to the shared scene; and
  a session management entity configured to generate data objects describing the at least one annotation to the shared scene and communicate the generated data objects to the different user devices to synchronize a view of the shared scene for the users of the different devices.

8. The user device of claim 7, wherein the video channel comprises a frame encoded video data stream, the intrinsic capture device data and the extrinsic capture device data are encoded as the supplemental enhancement information message, and the video decoder comprises:
  a frame decoder configured to frame decode the encoded video data stream; and
  a supplemental enhancement information extractor configured to extract and decode the supplemental enhancement information messages from within the encoded video data stream.

9. The user device of claim 8, wherein the supplemental enhancement information extractor comprises:
  a scanner configured to proxy scan incoming network abstraction layer units; and
  an extractor configured to extract intrinsic capture device data and extrinsic capture device data from the supplemental enhancement information message appended with each frame.

10. A method implemented at a user device within a communication architecture, the method comprising:
  determining image data from an image capture device for creation of a video channel defining a shared scene that includes at least one interactive object associated with a media type, the shared scene configured for viewing by and interaction with users of different user devices;
  determining intrinsic capture device data associated with the image capture device and extrinsic capture device data associated with the image data, the intrinsic capture device data and the extrinsic capture device data being separate from the image data;
  encoding the image data, the intrinsic capture device data, and the extrinsic capture device data within the shared scene for transmission to the different user devices, wherein the intrinsic capture device data and the extrinsic capture device data are encoded as one of a supplemental enhancement information (SEI) message appended to image frames of the image data or custom attribute values appended to image frames of the image data;
  displaying a user interface that enables a user to apply at least one annotation to the shared scene by manipulating the at least one interactive object or adding an additional interactive object to the shared scene; and
  generating data objects describing the at least one annotation to the shared scene and communicating the generated data objects to the different user devices to synchronize a view of the shared scene for the users of the different devices.

11. The method of claim 10, wherein the intrinsic capture device data and the extrinsic capture device data are encoded as the supplemental enhancement information message, and encoding the image data, the intrinsic capture device data, and the extrinsic capture device data within the video channel comprises:
  encoding the image data as image frames; and
  encoding the intrinsic capture device data, and the extrinsic capture device data as the supplemental enhancement information message appended to the image frames.

12. The method of claim 10, wherein determining image data from an image capture device for the creation of a video channel defining the shared scene comprises:
  receiving RGB frame data; and
  generating image data from the RGB frame data.

13. The method of claim 12, wherein determining intrinsic capture device data associated with the image capture device and extrinsic capture device data associated with the image data comprises receiving the intrinsic capture device data, receiving the extrinsic capture device data, encoding the intrinsic capture device data and the extrinsic capture device data as the custom attribute values and appending the custom attribute values to the image data.

14. The method of claim 10, wherein the intrinsic capture device data comprises camera projection matrix data.

15. The method of claim 10, wherein the extrinsic capture device data comprises camera pose data.

16. A method implemented at a user device within a communication architecture, the method comprising:
  displaying a user interface that enables a user to apply at least one annotation to a shared scene by manipulating at least one interactive object or adding an additional interactive object to the shared scene; and
  generating data objects describing the at least one annotation to the shared scene received via a video channel and communicating the generated data objects to different user devices to synchronize a view of the shared scene for the user device and the different user devices, wherein:
the video channel comprises a frame encoded video data stream,
intrinsic capture device data and extrinsic capture device data are encoded as supplemental enhancement information messages in an encoded video data stream representing the shared scene received via a video channel, and
extracting and decoding the image data from the video channel comprises frame decoding the encoded video data stream, and extracting the intrinsic capture device data, and the extrinsic capture device data comprises extracting and decoding the supplemental enhancement information messages from within the encoded video data stream.

17. The method of claim 16, wherein extracting and decoding the supplemental enhancement information messages from within the encoded video data stream comprises:
scanning incoming network abstraction layer units; and
extracting the intrinsic capture device data and the extrinsic capture device data from the supplemental enhancement information message appended to frames of the encoded video data stream.

18. A computer program product, the computer program product being embodied on a computer-readable storage medium and configured so as, when executed on a processor of a user device within a communication architecture, to:
determine image data from an image capture device for creation of a video channel defining a shared scene, the shared scene configured for viewing by and interaction with users of different user devices;
determine intrinsic capture device data and extrinsic capture device data associated with the image capture device, the intrinsic capture device data and the extrinsic capture device data being separate from the image data;
encode the image data, the intrinsic capture device data, and the extrinsic capture device data within the video channel for transmission to the different user devices, wherein the intrinsic capture device data and the extrinsic capture device data are encoded as one of a supplemental enhancement information (SEI) message appended to image frames of the image data or custom attribute values appended to image frames of the image data;
display a user interface that enables a user to apply at least one annotation to the shared scene by manipulating the at least one interactive object or adding an additional interactive object to the shared scene; and
generate data objects describing the at least one annotation to the shared scene and communicate the generated data objects to the different user devices to synchronize a view of the shared scene for the users of the different devices.

19. A computer program product, the computer program product being embodied on a computer-readable storage medium and configured so as when executed on a processor of a user device within a communication architecture, to:
receive a video channel comprising Image data for a shared scene that includes at least one interactive object associated with a media type, the shared scene configured for viewing by and interaction with users of different user devices, the image data captured by an image capture device, the image data captured by the image capture device being associated with intrinsic capture device data and with extrinsic capture device data, the intrinsic capture device data and the extrinsic capture device data being separate from the image data;
extract and decode the image data from the video channel;
extract intrinsic capture device data associated with the image capture device and extrinsic capture device data associated with the image capture device, wherein the intrinsic capture device data and the extrinsic capture device data are extracted and decoded as one of a supplemental enhancement information (SEI) message appended to image frames of the image data or custom attribute values appended to image frames of the image data;
display a user interface that enables a user to apply at least one annotation to the shared scene by manipulating the at least one interactive object or adding an additional interactive object to the shared scene; and
generate data objects describing the at least one annotation to the shared scene and communicate the generated data objects to the different user devices to synchronize a view of the shared scene for the users of the different devices.

* * * * *